Dec. 14, 1965 L. BLOK ETAL 3,223,907
APPARATUS FOR THE PRODUCTION OF ULTRASONIC OSCILLATIONS
Filed Oct. 1, 1962

INVENTOR
LOURENS BLOK
HERMANUS S.J. PIJLS
BY
Frank R. Trifari
AGENT

United States Patent Office 3,223,907
Patented Dec. 14, 1965

3,223,907
APPARATUS FOR THE PRODUCTION OF
ULTRASONIC OSCILLATIONS
Lourens Blok and Hermanus Stephanus Josephus Pijls,
Emmasingel, Eindhoven, Netherlands, assignors to
North American Philips Company, Inc., New York,
N.Y., a corporation of Delaware
Filed Oct. 1, 1962, Ser. No. 227,453
Claims priority, application Netherlands, Oct. 3, 1961,
269,876
10 Claims. (Cl. 318—118)

The invention relates to apparatus for the production of high power ultrasonic oscillations in which the current at ultrasonic frequency produced by the oscillator is supplied to the winding of a piezomagnetic transducer connected in the load circuit and from this pizomagnetic transducer an electric voltage is derived which is fed back as a feedback voltage through a feedback circuit coupled with the load circuit of the oscillator. Such apparatus are successfully used in practice for cleaning, making emulsions and dispersions, degassing and the like.

It is an object of the present invention to provide apparatus of the type described which provides maximum efficiency in the conversion of electric energy into mechanical vibration energy and is further distinguished by its high reliability and simple operation.

The apparatus in accordance with the invention is characterized in that the feedback voltage for the oscillator is taken from the winding of a second piezomagnetic transducer which is rigidly connected to the piezomagnetic transducer connected in the load circuit. The natural frequency of the second piezomagnetic transducer is preferably substantially equal to the natural frequency of the piezomagnetic transducer in the load circuit, and the windings of the two piezomagnetic transducers are magnetically decoupled from one another. The apparatus is further characterized in that there is connected in the load circuit in series with the winding of the piezomagnetic transducer a series capacitor which is tuned with the inductive component of the piezomagnetic transducer connected in the load circuit substantially to the natural frequency of said transducer.

The invention and its advantages will now be described more fully with reference to the figures.

Figure 1:
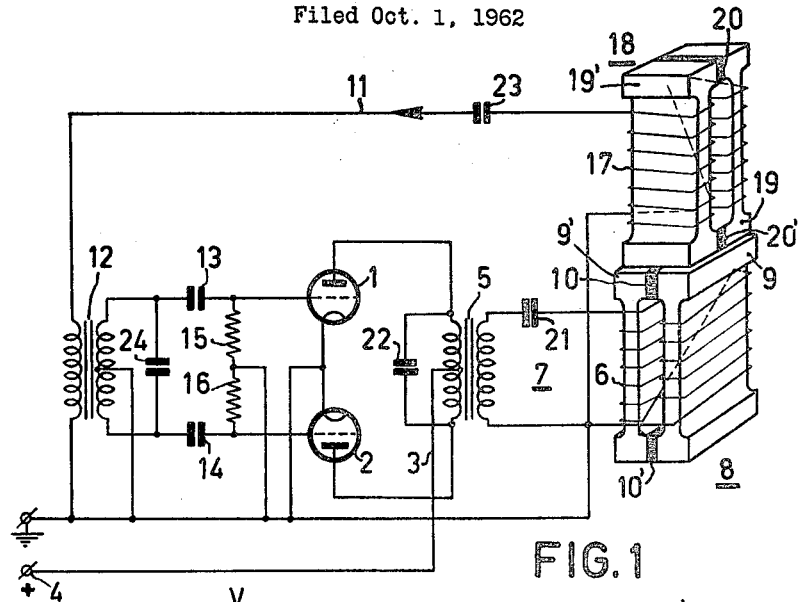
FIGURE 1 shows an embodiment of an apparatus in accordance with the invention.

In the apparatus shown in FIGURE 1, the ultrasonic energy having a frequency of, for example, 21 kc./s. is derived from a push-pull vacuum tube oscillator comprising triodes 1 and 2 having anodes which are connected to a positive terminal 4 of a supply voltage source by a lead 3. The apparatus shown is rated for a power of, for example, 200 watts.

The oscillator current produced upon oscillation of the vacuum tube oscillator 1, 2 is supplied through a matching transformer 5 to a winding 6 of a piezomagnetic transducer 8 connected in a load circuit 7 of the oscillator 1, 2 so that the transducer is set into vibration and delivers its mechanical energy to the load, for example, to a liquid bath.

In its structure the piezomagnetic transducer 8 comprises two I-shaped members 9 and 9' made of a piezomagnetic material having a small loss angle, for example, a material known under the trademark Ferroxcube which mainly consists of non-conductive ferrites. The structure further includes interposed bias magnetization plates 10 and 10' of permanent magnetic material in the form of, for example, a material known under the trademark Ferroxdur consisting of non-cubic crystals of polyoxides of iron and at least one of the metals barium, strontium, lead and, as the case may be, calcium. The use of Ferroxcube type material as the piezomagnetic material provides the important advantage that in the piezomagnetic transducer the efficiency of conversion of the electric energy into mechanical vibration energy has a very high value. The bias magnetization need not be provided with the aid of the permanent magnetic plates 10 and 10' but may be achieved in a different manner, for example, by providing the piezomagnetic transducer with a bias magnetization winding connected to a suitable bias source (not shown).

To obtain the feedback voltage required for driving the tubes 1 and 2 forming the oscillator, a feedback circuit 11 of the oscillator 1, 2 is coupled with the piezomagnetic transducer 8. The feedback voltage derived from the piezomagnetic transducer 8 is applied through a feedback transformer 12 and grid capacitors 13, 14 to the control grids of the triodes 1 and 2 which through grid resistors 15 and 16 are connected to the grounded cathodes of the said triodes 1 and 2.

It has been found that in the apparatus hitherto described the efficiency of the conversion of electric energy into mechanical vibration energy delivered by the piezomagnetic transducer 8 is highly unsatisfactory due to the differences in parameters of the oscillatory systems formed by the oscillator 1, 2 and the magnetic transducer 8, which are particularly marked at high loads.

Figure 2A:
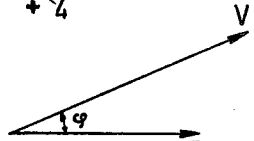
FIGURE 2a and 2b are current-voltage diagrams illustrating the operation of the apparatus shown in FIGURE 1.

The cause for this unsatisfactory operation is illustrated by FIGURE 2a showing the current-voltage diagram of the piezomagnetic transducer 8 for a particular load when this piezomagnetic transducer 8 is supplied with a current I of a frequency $\omega_0$ which is exactly the same as the natural frequency of the transducer 8. Under these circumstances there is produced between the current I and the voltage V across the piezomagnetic transducer 8 a phase shift $\varphi$ which increases with increase in the load.

If, now, the piezomagnetic transducer 8 is included as a frequency determining element in the load circuit 7 of the oscillator 1, 2, the latter will not oscillate exactly at the natural frequency $\omega_0$ of the piezomagnetic transducer 8 but will show a frequency deviation from the natural frequency $\omega_0$ determined by the phase angle $\varphi$. To satisfy the condition of oscillation, the oscillator 1, 2 adjusts itself to a frequency $\omega$ such that for this frequency the impedance of the piezomagnetic transducer 8 is real, that is to say, that for this frequency $\omega$ the voltage across the piezomagnetic transducer 8 is exactly in phase with the energizing current. Thus the piezomagnetic transducer 8 is not excited exactly in its natural frequency $\omega_0$ and this is one of the reasons of the above mentioned phenomenon that when the piezomagnetic transducer 8 is loaded the conversion of the electric energy into mechanical vibration energy is particularly unsatisfactory.

The invention provides optimum efficiency of this energy conversion by matching the different parameters of the oscillatory systems formed by the oscillator 1, 2 and by the piezomagnetic transducer 8. The feedback voltage for the oscillator 1, 2 is taken from the winding 17 of a second piezomagnetic transducer 18 rigidly secured to the piezomagnetic transducer 8 included in the load circuit 7, while the natural frequency $\omega_0$ of the second transducer is substantially the same as that of the transducer 8. The windings 6 and 17 of the two piezomagnetic transducers 8 and 18 are magnetically decoupled from one another. The structure of the piezomagnetic transducer 18 is preferably the same as that of the piezomagnetic transducer 8, the I-shaped members of piezomagnetic material being designated by 19 and 19' and the bias magnetisation plates by 20 and 20'. Furthermore, the two piezomagnetic transducers 8 and 18 are rigidly secured to one another, for example, by gluing or cementing. Although a specific construction of the piezomagnetic transducer has been illustrated, it is of course obvious that various modifications of this construction will suggest themselves without departing from the spirit of the invention. For example, individual transducers 8 and 18 may be manufactured as an integral unit, proper care being taken to provide magnetic decoupling between the input winding 6 and the feedback winding 17.

When the piezomagnetic transducer 8 connected in the load circuit 7 is energized by a current I at its natural frequency $\omega_0$, the piezomagnetic transducer 18 rigidly secured thereto is excited in its mechanical natural frequency $\omega_0$, and it is found that by the piezomagnetic effect there is produced in the winding 17 of the piezomagnetic transducer 18 a voltage $V_t$ which in the apparatus shown is exactly in phase with the current I of the piezomagnetic transducer 8. In the embodiment shown, for example, the current-voltage diagram of the current I of the piezomagnetic transducer 8 and the feedback voltage $V_t$ derived from the piezomagnetic transducer 18 has the form shown in FIGURE 2b.

Figure 2B:
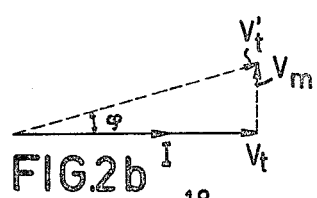

With only mechanical coupling of the two piezomagnetic transducers 8 and 18, the phase relationship between the current I and the feedback voltage $V_t$ shown in FIGURE 2b is produced by the piezomagnetic effect irrespective of the load condition. This phase relationship causes the oscillator 1, 2 to oscillate exactly at its natural frequency $\omega_0$. If there should also be magnetic coupling between the windings 6 and 17, a voltage $V_m$ shown by a broken line in FIGURE 2b would be induced by this magnetic coupling in the winding 17 of the piezomagnetic transducer 18 with a resulting phase shift $\varphi$ between the current I and the feedback voltage $V_t'$ so that, as has been explained hereinbefore, the frequency of the oscillations produced by the oscillator 1, 2 would differ from the natural frequency of the piezomagnetic transducer 8.

By the use of piezomagnetic transducers 8 and 18 of the type shown having closed magnetic circuits, satisfactory magnetic decoupling of the windings 6 and 17 of the said transducers 8 and 18 is obtained. This decoupling may, if required, be improved by simply securing the two transducers 8 and 18 to one another in the manner shown with an angular displacement of 90°. Effective magnetic decoupling may be achieved in a different manner, for example, by securing the two piezomagnetic transducers 8 and 18 to one another with the interposition of a plate of ferromagnetic material, for example, Ferroxcube type material having a high permeability ($/\mu = 1200$).

As explained hereinbefore, the use of the measures described ensures excitation of the piezomagnetic transducer 8 exactly at its natural frequency irrespective of the operating conditions and further provides the important advantage that by the inclusion of the piezomagnetic transducer 18 in the feedback circuit, a sufficient amount of feedback power may be derived to drive an oscillator operated in class C without the interposition of an amplifier.

To provide satisfactory efficiency of the conversion of the electric energy, into mechanical vibration energy the above described measures are of essential importance. However, in another sense the said measures impede the achievement of the overall object aimed at. The measures especially counteract correct load matching between the oscillator tubes 1, 2 and the piezomagnetic transducer 8 since, as the vector diagram of FIGURE 2a shows, the voltage V across the piezomagnetic transducer 8 leads the current I by an angle $\varphi$. In other words, the tube load constituted by the piezomagnetic transducer 8 at its natural frequency contains an inductive component.

While retaining the advantages achieved, the said load matching and hence maximum energy transfer from the oscillator tubes 1, 2 to the piezomagnetic transducer 8 are simply achieved in the apparatus described by connecting in the load circuit 7 a series capacitor 21 with which the inductive component of the piezomagnetic transducer 8 are tuned to the natural frequency of the transducer since it is found that the said inductive component remains substantially constant with varying loads provided that the piezomagnetic transducer is excited at its natural frequency $\omega_0$. Thus the load of the oscillator consists only of a real impedance which may be matched to the oscillator tubes 1, 2 by suitable design of the transformer 5.

In this manner, and by using the measures described, an apparatus for producing ultrasonic oscillations is obtained which has a simple structure and is distinguished by maximum efficiency.

For further improvement of the apparatus described, the matching transformer 5 is tuned by a parallel capacitor 22 substantially to the natural frequency of the piezomagnetic transducer 8. The tuned transformer 5, 22 together with the tuned series circuit 21, 6 in the load circuit 7 has a band-pass characteristic similar to that of a band-pass filter having a bandwidth of, for example, 2 kc./s. at the natural frequency of the piezomagnetic transducer 8. The input circuit of the said band-pass filter, which circuit comprises the tuned transformer 5, 22, has a very low impedance for frequencies outside the pass-band of the band-pass filter so that for such oscillations, high voltages cannot be set up at the anodes of the tubes 1, 2 which otherwise might give rise to increased tube dissipation. This step is of particular importance for oscillator tubes operated in class C in which the pulsatory tube currents contain strong harmonic components.

The feedback circuit 11 is also given a pass characteristic similar to that of a band-pass filter by tuning the inductive component of the piezomagnetic transducer 18 with the aid of a series capacitor 23, and the secondary of the feedback transformer 12 with the aid of a parallel capacitor 24, substantially to the natural frequency of the transducer 18. Thus penetration of undesirable frequencies into the feedback circuit 11 is also avoided and further phase shifts of the feedback voltage in the feedback circuit 11 due, for example, to the occurrence of grid currents in the oscillator tubes 1 and 2 are greatly reduced.

The following data is given for an apparatus of the type described which was extensively tested in practice.

| | |
|---|---|
| Tubes 1 and 2 | 2 x TB 2,5/400 |
| Inductances of the piezomagnetic transducers 8 and 18 /$\mu$h | 146 |
| Transformation ratio of the transformer 5 | 1:10 |
| Transformation ratio of the transformer 12 | 3.5:1 |
| Capacitor 21 /$\mu$f | 0.16 |
| Capacitor 22 /$\mu$/$\mu$f | 900 |
| Capacitor 23 /$\mu$f | 0.16 |
| Capacitor 24 /$\mu$f | 0.008 |

In addition to the above mentioned advantages, namely simple structure, suitability for oscillators operated in class C, maximum conversion efficiency and advantageous tube loading, the apparatus described is simple in operation since no frequency re-adjustment is required. Furthermore, it provides the important practical advantage of high reliability since it has been found that piezomagnetic transducers may be exposed to greatly varying operating conditions without risk of failure because there is no build-up effect in the piezo-magnetic transducer to excessive mechanical vibration amplitudes even under widely varying operating conditions.

Figure 3:
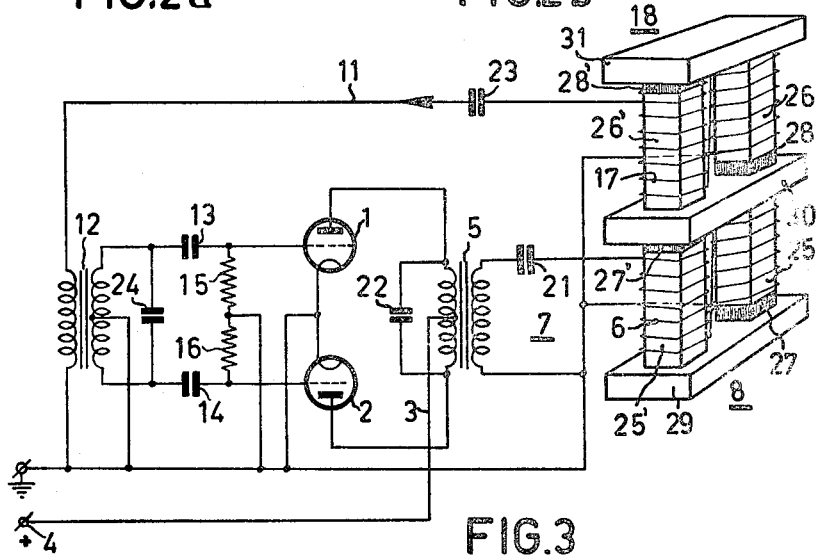
FIGURE 3 shows another embodiment of an apparatus in accordance with the invention.

FIGURE 3 shows a modified embodiment of the apparatus shown in FIGURE 1, corresponding elements being designated by like reference numerals.

The apparatus shown in FIGURE 3 differs from the apparatus shown in FIGURE 1 in that the piezomagnetic transducers 8 and 18 used are of another type. More particularly, piezomagnetic transducers having open magnetic circuits are used which consist of rods 25, 25' and 26, 26' of piezomagnetic material which are provided with bias magnetization by permanent-magnetic plates 27, 27' and 28, 28' respectively. To achieve effective magnetic decoupling between the energizing windings 6 and 17 of the piezomagnetic transducers 8 and 18 in the load circuit 7 and in the feedback circuit 11, respectively, cross pieces 29, 30 and 31 composed of material having a high permeability, for example, Ferroxcube type material having a permeability of 1200, are interposed between the piezomagnetic transducers 8 and 18.

Finally, it should be pointed out that in the apparatus described, in spite of the rigid joining of the piezomagnetic transducers 8 and 18 resulting in a vibrating system having mechanical dimensions and hence a natural frequency different from those of the separate piezomagnetic transducers 8 and 18, in the load circuit 7 and the feedback circuit 11 no troublesome secondary effects have been found which may adversely affect satisfactory operation of the apparatus described. In particular, in the apparatus described there are no perceptible oscillations having a frequency other than the natural frequency of the piezomagnetic transducers.

What is claimed is:

1. Apparatus for producing oscillations comprising an amplifying device including an input circuit and an output circuit, a load circuit comprising a piezomagnetic transducer, said transducer comprising a pair of I-shaped piezomagnetic members positioned adjacent each other to form a substantially closed magnetic path, said transducer having a winding thereon for producing vibration in said transducer and connected to said output circuit, said transducer having a predetermined natural frequency of oscillation, a second piezomagnetic transducer mechanically coupled to said first transducer so as to vibrate in response to vibration of said first transducer, said second transducer comprising a pair of I-shaped piezomagnetic members positioned adjacent each other to form a substantially closed magnetic path, said second transducer being arranged perpendicular to said first transducer and having a winding disposed thereon which is electromagnetically isolated from said first transducer winding and in which a feedback voltage of said predetermined frequency is produced by piezomagnetic action, the natural frequency of said first and second transducers being substantially equal, and means for applying said feedback voltage derived in the winding of said second transducer to said input circuit whereby oscillations are sustained in said apparatus substantially at said predetermined natural frequency for varying load conditions.

2. Apparatus for producing oscillations comprising an amplifying device including an input circuit, a load circuit for said amplifying device comprising a piezomagnetic transducer having an opening therein along a given axis, said transducer having a winding disposed thereon so that a magnetic field produced by current flow in said winding has a closed magnetic path around said opening, said transducer having a predetermined natural frequency of oscillation and an inductive impedance component at said frequency, means for applying an oscillation voltage of said predetermined frequency produced in said amplifying device to said transducer winding, a second piezomagnetic transducer having an opening therein along a given axis, said second transducer having a winding disposed thereon, the natural frequency of said first and second transducers being approximately equal, said second transducer being secured to said first transducer so that said given axis of said second transducer is perpendicular to said given axis of said first transducer, whereby a feedback voltage of said predetermined natural frequency is induced in said second transducer winding by piezomagnetic action, said first and second transducer windings being magnetically decoupled from one another, said load circuit further comprising capacitor means serially connected with said first transducer winding and forming with the inductive component of said first transducer a resonant circuit tuned to said predetermined frequency, and means for applying said feedback voltage to said input circuit whereby oscillations in said apparatus are sustained substantially at said predetermined natural frequency for varying load conditions.

3. Apparatus for producing oscillations comprising an amplifying device including an input circuit, a load circuit for said amplifying device comprising a piezomagnetic transducer having a winding disposed thereon, said transducer having a predetermined natural frequency of oscillation and comprising two substantially I-shaped members composed of a piezomagnetic material having a small loss angle and secured together to form a substantially closed magnetic path, means for applying an oscillation voltage of said predetermined frequency produced in said amplifying device to said transducer winding, a second piezomagnetic transducer substantially identical to said first transducer and mechanically coupled thereto with an angular displacement of substantially 90°, said second transducer having a winding disposed thereon which is magnetically decoupled from said first transducer winding, the natural frequency of said first and second transducers being substantially equal, means for deriving a feedback voltage of said predetermined frequency from said second transducer winding, and means for applying said feedback voltage to said input circuit whereby oscillations in said apparatus are sustained substantially at said predetermined natural frequency for varying load conditions.

4. Apparatus for producing oscillations comprising an amplifying device including an input circuit and an output circuit, a load circuit comprising a piezomagnetic transducer shaped to form a closed magnetic flux path and having a winding disposed thereon, said transducer having a predetermined natural frequency of oscillation and an inductive impedance component at said frequency, said output circuit comprising a transformer coupling said amplifying device to said load circuit and a first capacitor connected across the primary winding of said transformer in order to tune said transformer substantially to the natural frequency of said transducer, said load circuit further comprising capacitor means serially connected with said first transducer winding and forming with said inductive component of said first transducer a resonant circuit tuned to said predetermined frequency, the combination of said tuned transformer and said tuned load circuit forming a band-pass filter having its pass-band substantially centered at the natural frequency of said transducer, a second piezomagnetic transducer shaped to form a closed magnetic flux path and rigidly secured to said first transducer, said second transducer having a winding dispsoed thereon which is electromagnetically isolated from said first transducer winding and in which a feedback voltage of said predetermined frequency is produced by piezomagnetic action the natural frequency of said first and second transducers being substantially equal, and means for applying said feedback voltage to said input circuit whereby oscillations in said apparatus are sustained substantially at said predetermined natural frequency for varying load conditions.

5. Apparatus for producing ultrasonic vibrations comprising an amplifying device having an input circuit and an output circuit, a first transducer comprising a core element composed of piezomagnetic material and shaped to form a closed magnetic flux path, said transducer having a given natural frequency of vibration and having a winding disposed thereon, means for coupling said output circuit to said winding thereby to supply an alternating current of said given frequency to said winding, a second transducer comprising a core element composed of piezomagnetic material and shaped to form a closed magnetic flux path and having a winding disposed thereon which is magnetically isolated from said first transducer winding, said second transducer having a natural frequency of vibration approximately equal to said first transducer given natural frequency, means for securing said second transducer to said first transducer so as to vibrate in response to vibration of said first transducer thereby to induce an alternating voltage of said given frequency in said second transducer winding by piezomagnetic action, and means for coupling said second transducer winding to said input circuit of said amplifying device.

6. Apparatus as described in claim 5 further comprising a capacitor serially connected with said first transducer winding to form a series resonant circuit therewith tuned to said given frequency.

7. Apparatus as described in claim 6 further comprising a second capacitor serially connected with said second transducer winding to form a series resonant circuit therewith tuned to said given frequency.

8. Apparatus for producing oscillations comprising an amplifying device including an input circuit, a load circuit for said amplifying device comprising a piezomagnetic transducer having a winding disposed thereon, said transducer having a predetermined natural frequency of oscillation and an inductive impedance component at said frequency, means for applying an oscillation voltage of said predetermined frequency produced in said amplifying device to said transducer winding, a second piezomagnetic transducer having a winding disposed thereon, the natural frequency of said first and second transducers being approximately equal, a plate of ferromagnetic material having a relatively high magnetic permeability and interposed between said first and second transducers thereby providing magnetic isolation between said first and second transducer windings, said first and second transducers being secured to one another by means of said plate whereby a feedback voltage of said predetermined natural frequency is induced in said second transducer winding by piezomagnetic action, said load circuit further comprising capacitor means serially connected with said first transducer winding and forming with the inductive component of said first transducer a resonant circuit tuned to said predetermined frequency, and means for applying said feedback voltage to said input circuit whereby oscillations in said apparatus are sustained substantially at said predetermined natural frequency for varying load conditions.

9. Apparatus as described in claim 4 wherein said feedback voltage applying means comprises a feedback transformer connected to the input circuit of said amplifying device, a second capacitor connected in series with said second transducer winding and forming therewith a resonant circuit tuned to the natural frequency of said transducer, and a third capacitor connected in parallel with one winding of said feedback transformer thereby to tune said transformer to said predetermined frequency.

10. Apparatus for producing oscillations comprising an amplifying device including an input circuit, a load circuit for said amplifying device comprising a piezomagnetic transducer having a winding disposed thereon, said transducer having a predetermined natural frequency of oscillation and an inductive impedance component at said frequency, means for applying an oscillation voltage of said predetermined frequency produced in said amplifying device to said transducer winding, a second piezomagnetic transducer having a winding disposed thereon, the natural frequency of said first and second transducers being approximately equal, said second transducer being mechanically coupled to said first transducer whereby a feedback voltage of said predetermined natural frequency is induced in said second transducer winding by piezomagnetic action, said first and second transducer windings being magnetically decoupled from one another, said first transducer comprising a closed path of magnetic material for confining therein the flux produced by current flow in said first transducer winding and said second transducer comprising a second closed path of magnetic material for confining therein the flux produced by current flow in said second transducer winding thereby providing said magnetic decoupling between said windings, said load circuit further comprising capacitor means serially connected with said first transducer winding and forming with the inductive component of said first transducer a resonant circuit tuned to said predetermined frequency, and means for applying said feedback voltage to said input circuit thereby to sustain oscillations in said apparatus substantially at said predetermined natural frequency.

References Cited by the Examiner
UNITED STATES PATENTS

| | | | |
|---|---|---|---|
| Re. 19,461 | 2/1935 | Pierce | 318—118 |
| 2,000,026 | 5/1935 | Ide | 318—118 |
| 2,014,411 | 9/1935 | Pierce | 318—118 |
| 2,959,746 | 11/1960 | Sears | 331—116 |
| 3,151,284 | 9/1964 | Kleesattel | 318—118 |

MILTON O. HIRSHFIELD, *Primary Examiner.*